(12) United States Patent
Khosravirad et al.

(10) Patent No.: US 12,532,214 B2
(45) Date of Patent: Jan. 20, 2026

(54) DETERMINING TARGET BLOCK ERROR RATE FOR IMPROVED RADIO EFFICIENCY

(71) Applicant: Nokia Technologies Oy, Espoo (FI)

(72) Inventors: Saeed Reza Khosravirad, Summit, NJ (US); Olav Emerik Tirkkonen, Helsinki (FI); Mikko Aleksi Uusitalo, Helsinki (FI); Paolo Baracca, Stuttgart (DE); Dani Johannes Korpi, Helsinki (FI); Ulo Parts, Helsinki (FI); Liang Zhou, Espoo (FI)

(73) Assignee: Nokia Technologies Oy, Espoo (FI)

( * ) Notice: Subject to any disclaimer, the term of this patent is extended or adjusted under 35 U.S.C. 154(b) by 405 days.

(21) Appl. No.: 18/273,077

(22) PCT Filed: Jan. 21, 2021

(86) PCT No.: PCT/FI2021/050037
§ 371 (c)(1),
(2) Date: Jul. 19, 2023

(87) PCT Pub. No.: WO2022/157413
PCT Pub. Date: Jul. 28, 2022

(65) Prior Publication Data
US 2024/0089787 A1    Mar. 14, 2024

(51) Int. Cl.
*H04W 28/18* (2009.01)
*H04L 1/1829* (2023.01)
(Continued)

(52) U.S. Cl.
CPC ....... *H04W 28/0268* (2013.01); *H04L 1/1858* (2013.01); *H04L 5/006* (2013.01); *H04W 28/18* (2013.01)

(58) Field of Classification Search
CPC ............... H04W 28/18; H04W 24/02; H04W 28/0268; H04W 28/0215; H04W 24/04; H04L 1/1858; H04L 5/006
See application file for complete search history.

(56) References Cited

U.S. PATENT DOCUMENTS

2011/0317650 A1    12/2011  Venkatachalam et al.
2018/0049047 A1*   2/2018   Lin .................. H04W 24/02
(Continued)

FOREIGN PATENT DOCUMENTS

WO       2018/189416 A1    10/2018
WO       2020/089851 A1    5/2020
WO    WO 2021/032279 A1    2/2021

OTHER PUBLICATIONS

Mohammed, N. A. et al., "Mission-Critical Machine-Type Communication: An Overview and Perspectives Towards 5G," IEEE Access, vol. 7, Jan. 23, 2019 (current version Sep. 18, 2019), pp. 127198-127216.

(Continued)

*Primary Examiner* — Syed Ali
(74) *Attorney, Agent, or Firm* — Nokia Technologies Oy

(57) ABSTRACT

Disclosed is a method including identifying a service availability requirement and a survival time requirement for a terminal device, estimating a reliability level of a feedback channel associated with the terminal device based at least partly on a link quality and one or more physical control channel attributes associated with the terminal device, and determining a first target block error rate value for a first operation mode of the terminal device and a second target block error rate value for a second operation mode of the terminal device based at least partly on the service availability requirement, the survival time requirement, and the estimated reliability level of the feedback channel.

16 Claims, 7 Drawing Sheets

(51) Int. Cl.
   *H04L 5/00*     (2006.01)
   *H04W 28/02*    (2009.01)

(56) References Cited

U.S. PATENT DOCUMENTS

| | | | |
|---|---|---|---|
| 2019/0058519 A1* | 2/2019 | Davydov | H04L 5/0053 |
| 2022/0173854 A1* | 6/2022 | Chae | H04L 1/1896 |
| 2023/0247504 A1* | 8/2023 | Haustein | H04W 76/19 |
| | | | 455/436 |

OTHER PUBLICATIONS

Shariatmadari, H. et al., "Link Adaptation Design for Ultra-Reliable Communications," IEEE International Conference on Communications (ICC 2016), May 22, 2016.

$3^{rd}$ Generation Partnership Project; Technical Specification Group Services and System Aspects, "Service requirements for cyber-physical control applications in vertical domains; Stage 1 (Release 17)," 3GPP TS 22.104 V17.4.0, Sep. 2020.

Tirkkonen, O. et al., "Optimized Survival Mode to Guarantee QoS for Time-critical Services," IEEE International Conference on Communications Workshops, Jun. 14, 2021.

"Discussion of LAN over 5G NR", 3GPP TSG-SA WG1 Meeting #77, S1-171166, Agenda: 5, Qualcomm, Feb. 13-17, 2017, 6 pages.

Extended European Search Report received for corresponding European Patent Application No. 21920898.0, dated Aug. 30, 2024, 15 pages.

* cited by examiner

DETERMINING TARGET BLOCK ERROR RATE FOR IMPROVED RADIO EFFICIENCY

CROSS REFERENCE TO RELATED APPLICATION

This patent application is a U.S. National Stage application of International Patent Application Number PCT/FI2021/050037 filed Jan. 21, 2021, which is hereby incorporated by reference in its entirety.

FIELD

The following exemplary embodiments relate to wireless communication.

BACKGROUND

As resources are limited, it is desirable to optimize the usage of network resources. A cell in a cellular communication network may be utilized such that better service may be provided for communicating with a terminal device. The optimization of the communication with the terminal device may therefore enable better usage of resources and enhanced user experience to a user of the terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: identify a service availability requirement and a survival time requirement for a terminal device; estimate a reliability level of a feedback channel associated with the terminal device based at least partly on a link quality and one or more physical control channel attributes associated with the terminal device; and determine a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided an apparatus comprising means for: identifying a service availability requirement and a survival time requirement for a terminal device; estimating a reliability level of a feedback channel associated with the terminal device based at least partly on a link quality and one or more physical control channel attributes associated with the terminal device; and determining a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided a method comprising identifying a service availability requirement and a survival time requirement for a terminal device; estimating a reliability level of a feedback channel associated with the terminal device based at least partly on a link quality and one or more physical control channel attributes associated with the terminal device; and determining a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided a computer program comprising instructions for causing an apparatus to perform at least the following: identify a service availability requirement and a survival time requirement for a terminal device; estimate a reliability level of a feedback channel associated with the terminal device based at least partly on a link quality and one or more physical control channel attributes associated with the terminal device; and determine a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided a computer readable medium comprising program instructions for causing an apparatus to perform at least the following: identify a service availability requirement and a survival time requirement for a terminal device; estimate a reliability level of a feedback channel associated with the terminal device based at least partly on a link quality and one or more physical control channel attributes associated with the terminal device; and determine a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided a non-transitory computer readable medium comprising program instructions for causing an apparatus to perform at least the following: identify a service availability requirement and a survival time requirement for a terminal device; estimate a reliability level of a feedback channel associated with the terminal device based at least partly on a link quality and one or more physical control channel attributes associated with the terminal device; and determine a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided an apparatus comprising at least one processor, and at least one memory including computer program code, wherein the at least one memory and the computer program code are configured, with the at least one processor, to cause the apparatus to: transmit a request to a base station for reconfiguring a feedback channel between the apparatus and the base station based at least partly on a service availability requirement and a set of capabilities associated with the apparatus; and receive an indication from the base station indicating reconfiguration of the feedback channel.

According to another aspect, there is provided an apparatus comprising means for: transmitting a request to a base station for reconfiguring a feedback channel between the apparatus and the base station based at least partly on a service availability requirement and a set of capabilities associated with the apparatus; and receiving an indication from the base station indicating reconfiguration of the feedback channel.

According to another aspect, there is provided a method comprising transmitting a request to a base station for reconfiguring a feedback channel between the apparatus and the base station based at least partly on a service availability requirement and a set of capabilities associated with the apparatus; and receiving an indication from the base station indicating reconfiguration of the feedback channel.

According to another aspect, there is provided a computer program comprising instructions for causing an apparatus to perform at least the following: transmit a request to a base station for reconfiguring a feedback channel between the apparatus and the base station based at least partly on a service availability requirement and a set of capabilities associated with the apparatus; and receive an indication from the base station indicating reconfiguration of the feedback channel.

According to another aspect, there is provided a computer readable medium comprising program instructions for causing an apparatus to perform at least the following: transmit a request to a base station for reconfiguring a feedback channel between the apparatus and the base station based at least partly on a service availability requirement and a set of capabilities associated with the apparatus; and receive an indication from the base station indicating reconfiguration of the feedback channel.

According to another aspect, there is provided a non-transitory computer readable medium comprising program instructions for causing an apparatus to perform at least the following: transmit a request to a base station for reconfiguring a feedback channel between the apparatus and the base station based at least partly on a service availability requirement and a set of capabilities associated with the apparatus; and receive an indication from the base station indicating reconfiguration of the feedback channel.

According to another aspect, there is provided a system comprising at least a base station and a terminal device. The base station comprises means for: identifying a service availability requirement and a survival time requirement for the terminal device; estimating a reliability level of a feedback channel associated with the terminal device based at least partly on a link quality and one or more physical control channel attributes associated with the terminal device; and determining a first target block error rate value for a first operation mode of the terminal device and a second target block error rate value for a second operation mode of the terminal device based at least partly on the service availability requirement, the survival time requirement, and the estimated reliability level of the feedback channel.

According to another aspect, there is provided a system comprising at least a base station and a terminal device. The base station is configured to: identify a service availability requirement and a survival time requirement for the terminal device; estimate a reliability level of a feedback channel associated with the terminal device based at least partly on a link quality and one or more physical control channel attributes associated with the terminal device; and determine a first target block error rate value for a first operation mode of the terminal device and a second target block error rate value for a second operation mode of the terminal device based at least partly on the service availability requirement, the survival time requirement, and the estimated reliability level of the feedback channel.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
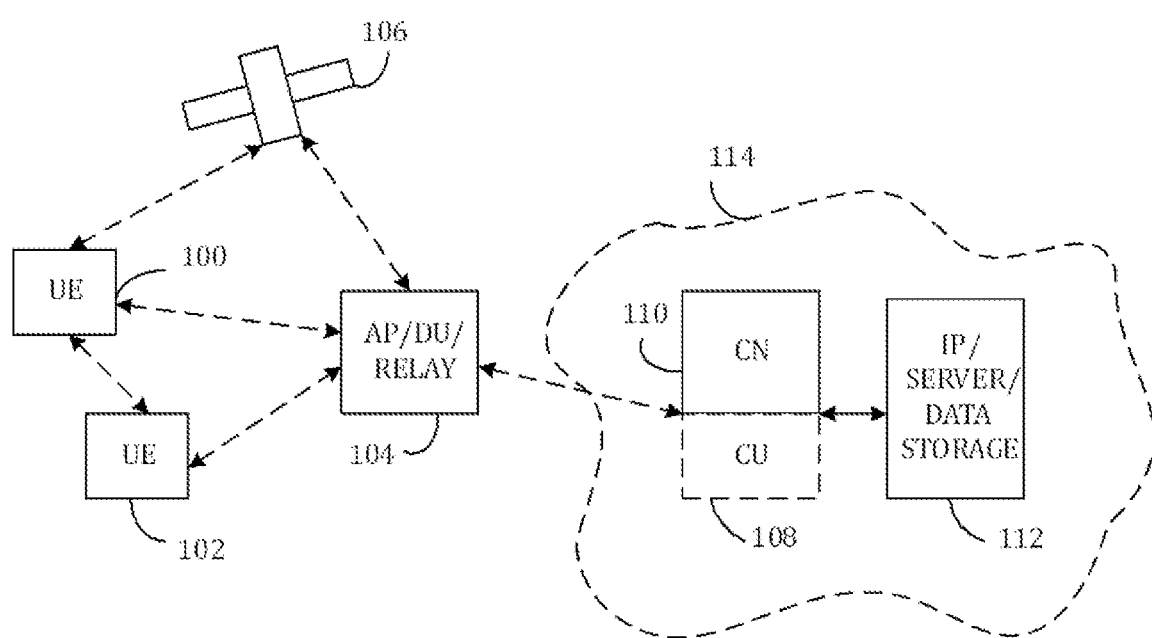
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB)

104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz—cmWave, below 6 GHz—cmWave—mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home (e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Ultra-reliable low-latency communication (URLLC) is a 5G communication service that provides low latency and high reliability for latency-sensitive applications, such as factory automation, the industrial internet of things (IIoT), and autonomous driving. The quality of service (QoS) requirements for cyber physical applications, such as industrial motion control, transit control, and process automation, may comprise for example survival time, service availability, service reliability, and transfer interval.

Survival time may be defined as the time that an application consuming a communication service may continue without an anticipated message. In other words, survival time may be defined as the time period that is tolerated by the control application without communication service. Survival time may be expressed as a time period or, for example in the case of cyclic traffic, as the maximum number of consecutive incorrectly received or lost messages. With regard to service availability, the system may be considered as unavailable to the cyber physical application when an expected message is not received by the application after the application's survival time expires, for example if the transfer time is larger than the maximum transfer latency. Service reliability states the mean value of how long the communication service is available before it becomes unavailable. Transfer interval may be defined as the time difference between two consecutive transfers of application data from an application via the service interface to the communication system.

For some cyber physical applications, communication may be required to stay alive for 1-10 years. For example, in motion control applications, a communication reliability (i.e. a mean time between failures) of approximately 10 years may be required along with an end-to-end latency as low as 0.5 ms, and a service availability of $10^{-5}$ (i.e. 99,999% of packages need to be delivered) to $10^{-9}$ (i.e. 99,9999999% of packages need to be delivered). Communication for cyber physical applications may also require efficient use of network and radio resources in addition to a highly reliable radio access.

Table 1 below depicts an example of service requirements for motion control. In Table 1, latency and reliability may be seen as the most stringent requirements for motion control applications. The service availability values in Table 1 imply that the communication service must be re-established with approximately 100% guarantee after being unavailable for one survival time.

TABLE 1

| Service availability | Service reliability | End-to-end latency | Message size [byte] | Transfer interval (TI) | Survival time | UE speed | # of UEs | Service area |
|---|---|---|---|---|---|---|---|---|
| 99.999% to 99.99999% | ~10 years | <TI | 50 | 500 μs | 500 μs | ≤75 km/h | ≤20 | 50 m × 10 m × 10 m |
| 99.9999% to 99.999999% | ~10 years | <TI | 40 | 1 ms | 1 ms | ≤75 km/h | ≤50 | 50 m × 10 m × 10 m |
| 99.9999% to 99.999999% | ~10 years | <TI | 20 | 2 ms | 2 ms | ≤75 km/h | ≤100 | 50 m × 10 m × 10 m |

The stringent reliability requirements of cyber physical applications may result in highly conservative transmission attributes, such as modulation and coding scheme (MCS), transmit power, and repetitions, which may drain the resources of the network. In the presence of service availability requirements such as the ones depicted in Table 1, this may become even more demanding on the network's resources, and substantially reduce the efficiency of the system. However, this issue can be addressed by smart design and planning of link adaptation and resource scheduling, as well as by utilizing the fact that a single packet error may be tolerated in cyber physical applications, while multiple consecutive errors may lead to failure at the application level and cause the system to enter an emergency mode. As an example, losing an individual packet may reduce the quality of experience (QoE) of a motion control system slightly, for example the motion accuracy of a robotic arm may be reduced, while losing two or three consecutive packets may trigger a safety mode which stops the robot(s) completely. Therefore, the decision-making of the scheduler during survival mode may depend on the reliability of the feedback channel, which indicates the probability of a feedback error causing a negative acknowledgement (NACK) to be detected as an acknowledgement (ACK) by mistake, which may be referred to as a NACK-to-ACK error. When there is a NACK-to-ACK error, the receiver has received a corrupt packet and thus sends a NACK to the transmitter, which is mistakenly detected as an ACK indicating successful reception of the packet, and thus the packet is not retransmitted from the transmitter to the receiver.

Survival mode refers to a mode, in which the last packet has been lost and the survival time counter has been triggered. In other words, during survival mode, the network is more concerned about the link. In survival mode, reliability requirements may be increased, whereas in normal mode the reliability requirements may be more relaxed compared to the survival mode. If a UE is in survival mode, the network can detect the survival mode by means of a feedback channel, which the UE may use to send feedback, such as a NACK, to the network in order to indicate that the last packet has failed. However, the detection of the survival mode may depend on the reliability of the feedback channel, as there is a chance of failure over the feedback channel as well.

Some exemplary embodiments may provide scheduling and signaling techniques to improve service availability, while improving the efficiency of radio resource utilization. Some exemplary embodiments may be used for wireless communication for cyber physical applications, such as communication for motion control in time-sensitive networking. However, some exemplary embodiments may be used for ultra-reliable communication in other contexts as well.

Figure 2:
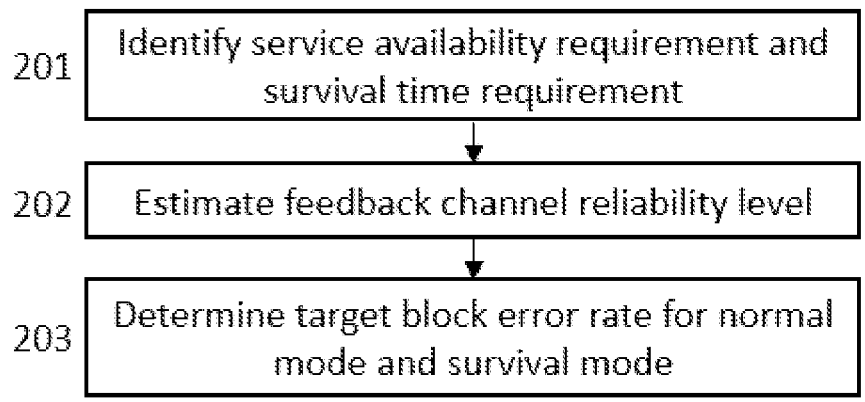
FIGS. 2-3 illustrate flow charts according to some exemplary embodiments.

FIG. 2 illustrates a flow chart according to an exemplary embodiment. The functions illustrated in FIG. 2 may be performed by an apparatus such as a base station, or by a scheduler comprised in a base station. In this exemplary embodiment, the target block error rate (BLER) for link adaptation is adjusted separately for transmissions in a normal operation mode and at least one survival operation mode.

Referring to FIG. 2, a service availability requirement and a survival time requirement for a UE are identified 201. The survival time requirement may be used to determine a limit of consecutive errors, which indicates the number of consecutive errors for declaring service non-availability by the UE. As an example, if the limit of consecutive errors is two, then the service is declared as non-available upon encountering two consecutive errors. For example, the limit of consecutive errors may be determined by dividing the survival time by the transfer interval in order to determine the number of allowed transfer intervals that the application can survive without communication service. The service availability requirement, the survival time requirement, and the transfer interval may be derived from the QoS of the UE's traffic flow and the probability of feedback error, such as NACK-to-ACK error.

A reliability level of a feedback channel associated with the UE is estimated 202 based on the configured attributes of the physical control channel and the link quality associated with the UE. The reliability level may be defined as reliability=1−uncertainty, wherein the uncertainty indicates the probability of feedback error. The reliability may be derived based on a measured link quality associated with the UE, and the physical uplink control channel (PUCCH) configuration specified by the base station, which may include for example the rounds of repetition and whether or not there is channel coding involved in the physical uplink control channel. The link quality may be measured, for example, as the distance to the UE, signal-to-noise ratio (SNR), signal-to-interference-plus-noise ratio (SINR), channel quality indicator (CQI), reference signal received power (RSRP), and/or reference signal received quality (RSRQ).

A first target BLER value for a first operation mode of the UE and a second target BLER value for a second operation mode of the UE are determined 203 based at least partly on the service availability requirement and the estimated reliability level. The first operation mode may be a normal mode, and the second operation mode may be a survival mode.

The above procedure may be similar for both downlink and uplink. In the downlink direction, where the periodic packet flow is from the base station to the UE, the survival mode is based on the feedback channel observations, such as NACK. In other words, a NACK implies packet failure, but the feedback channel may be erroneous itself, and thus there is uncertainty regarding whether the packet has actually failed as indicated by the NACK. In the uplink direction, where the periodic packet flow is from the UE to the base station, the survival mode is triggered by failure in decoding the packet, since the base station is decoding the packets itself. In this case, there is no uncertainty regarding packet failure, but survival mode and normal mode operation should still use different target BLER values.

Figure 3:
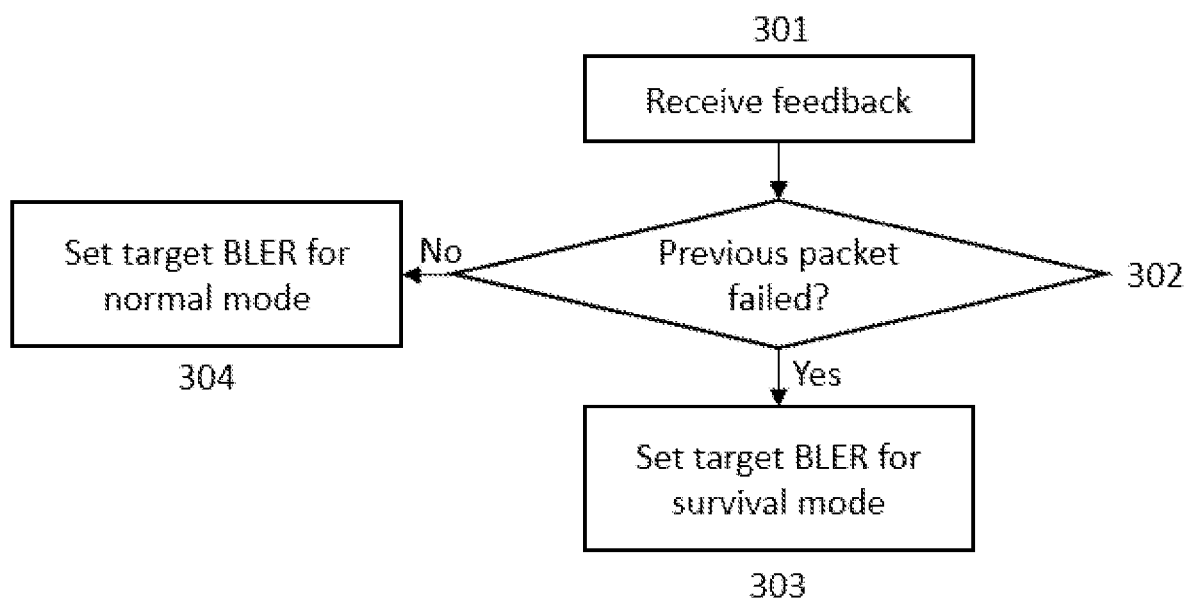

FIG. 3 illustrates a flow chart according to an exemplary embodiment, wherein the scheduler identifies which target BLER value to use based on the latest feedback report after determining the target BLER values for the normal mode and the survival mode according to block 203 of FIG. 2. A feedback is received 301 from the UE via the feedback channel. If the feedback indicates that the previous packet, i.e. the latest packet transmitted from the base station to the UE, has failed (302: yes), then the UE is in survival mode, and the target BLER value determined for the survival mode is set 303 as the target BLER for the UE. On the other hand, if the feedback indicates that the previous packet has been successfully received (302: no), then the UE is in normal mode, and the target BLER value determined for the normal mode is set 304 as the target BLER for the UE.

The procedure described above applies to the downlink direction, but it can also be applied in the uplink direction in a similar manner. In the uplink direction, the base station is receiving packets from the UE. The base station is also in charge of configuring the transmission attributes, i.e. target BLER, in the uplink for the UE. Therefore, if the base station fails in decoding a packet transmitted from the UE, it configures the UE for a survival mode target BLER by reconfiguring the uplink transmission attributes. On the other hand, if the base station successfully decodes the packet transmitted from the UE, it configures the UE for a normal mode target BLER.

The functions and/or blocks described above by means of FIGS. 2-3 are in no absolute chronological order, and some of them may be performed simultaneously or in an order differing from the described one. Other functions and/or blocks may also be executed between them or within them.

In some exemplary embodiments, a pre-defined look-up table may be utilized by the scheduler to determine the target BLER of the two or more modes based on the service availability requirement and feedback channel error rate. In other words, the look-up table may be used by measuring the reliability of the feedback channel, and looking up the required service availability value (which is a QoS parameter) for the link corresponding with the estimated reliability. By using these two parameters, the target BLER value can be found for the normal mode and the survival mode, respectively.

Table 2 below is an example of a pre-defined look-up table, which can be used to find target BLER values corresponding with the required service availability and probability of feedback channel error. In Table 2, M denotes the limit of consecutive errors, $P_{N2A}$ denotes the probability of NACK-to-ACK error, $P_{SNA}$ denotes target service non-availability ($P_{SNA}=1-P_{SA}$, wherein $P_{SA}$ denotes the service availability requirement), $P_n$ denotes the target BLER value in normal mode, and $P_s$ denotes the target BLER value in survival mode.

TABLE 2

| $P_{N2A}$ | $P_{SNA}$ | M = 2 | | M = 3 | |
| --- | --- | --- | --- | --- | --- |
| | | $P_n$ | $P_s$ | $P_n$ | $P_s$ |
| $10^{-2}$ | $10^{-7}$ | $3 \cdot 10^{-3}$ | $3 \cdot 10^{-5}$ | 0.02 | $2 \cdot 10^{-4}$ |
| $10^{-2}$ | $10^{-9}$ | $3 \cdot 10^{-4}$ | $3 \cdot 10^{-6}$ | 0.005 | $7 \cdot 10^{-5}$ |
| $10^{-3}$ | $10^{-7}$ | 0.01 | $10^{-5}$ | 0.05 | $7 \cdot 10^{-5}$ |
| $10^{-3}$ | $10^{-9}$ | $10^{-3}$ | $10^{-6}$ | 0.01 | $2 \cdot 10^{-5}$ |
| $10^{-4}$ | $10^{-7}$ | 0.03 | $3 \cdot 10^{-6}$ | 0.1 | $2 \cdot 10^{-5}$ |
| $10^{-4}$ | $10^{-9}$ | $3 \cdot 10^{-3}$ | $3 \cdot 10^{-7}$ | 0.02 | $3 \cdot 10^{-6}$ |

Link adaptation refers to translating a chosen $P_n$ or $P_s$ to a MCS or transport format used for payload transmission to the UE. Link adaptation may be based on, for example, CQI, RSRP, RSRQ, rank indicator (RI) and/or precoding matrix indicator (PMI). Outer loop link adaptation and/or statistical inference may be used, while look-up tables or functional approximations can be applied to choose the transport format.

In some exemplary embodiments, the target BLER value for the survival mode may not be fixed. For example, there may be multiple transmission intervals in the survival mode, and thus multiple target BLER values. In other words, in case of M>2, the survival mode spans over more than one transmission interval, and the individual transmission intervals may have different survival mode target BLER values. For example, if M>2, then the look-up table may comprise M−1 target BLER columns for the survival mode (i.e. $P_{s,1}, \ldots, P_{s,M-1}$). Thus, the survival mode target BLER value may be configured based also on the number of observed consecutive NACKs over the feedback channel, which implies consecutive failed packets up to M−1. In other words, the survival mode target block error rate value may be selected from a plurality of survival mode target block error rate values in the look-up table based at least partly on the number of consecutive NACKs received from the UE via the feedback channel.

The look-up table may be devised off-line for the user using analytical or empirical techniques. For example, the empirical approach may be based on simulations, or empirical measurements based on data collected from a real network system, to derive the applicable look-up table for a given channel distribution.

A model-based example of the analytical approach for devising the look-up table is presented in the following. In this example scenario, it is assumed that the survival time is equal to one cycle time, i.e. two consecutive errors are prohibited. It is further assumed that the error probabilities of successive transmissions are not correlated, and that data and feedback channels are independent.

In an exemplary sequence of events, there is a failed normal transmission, which is followed by a NACK-to-ACK error, in which case the UE does not enter survival mode, and the next transmission is a normal transmission. Thus, we need to have $P_n^2 P_{N2A} \leq P_{SNA}$, from which the target BLER for the normal mode can be determined as $P_n \leq \sqrt{P_{SNA}}/\sqrt{P_{N2A}}$. Therefore, a less reliable feedback channel requires a more reliable normal mode operation.

In another exemplary sequence of events, there is a failed normal transmission, which is followed by an error-free NACK, and the UE enters survival mode. This should not break service availability, since $P_n(1-P_{N2A}) P_s \leq P_{SNA}$, i.e. $P_s \leq P_{SNA}/P_n/(1-P_{N2A})$ Assuming a maximum value of $P_n$ (a greedy choice for normal transmissions), $$P_s \leq \frac{P_{SNA}}{\sqrt{P_{SNA}}} \sqrt{P_{N2A}}/(1-P_{N2A}) = \sqrt{P_{N2A}P_{SNA}}/(1-P_{N2A}) \approx \sqrt{P_{N2A}P_{SNA}},$$

and the allowed survival mode BLER increases with $P_{N2A}$.

Thus, if the survival mode can be made as reliable as possible, it may be beneficial to have a very small $P_{N2A}$, and thus a high $P_n$. In this case, an extremely reliable control channel may also be needed. In addition, if extreme reliability of the survival mode, or of the control channel, cannot be guaranteed, then a more reliable normal transmission mode may be needed. These two conclusions are illustrated in FIGS. 4 and 5.

Figure 4A:
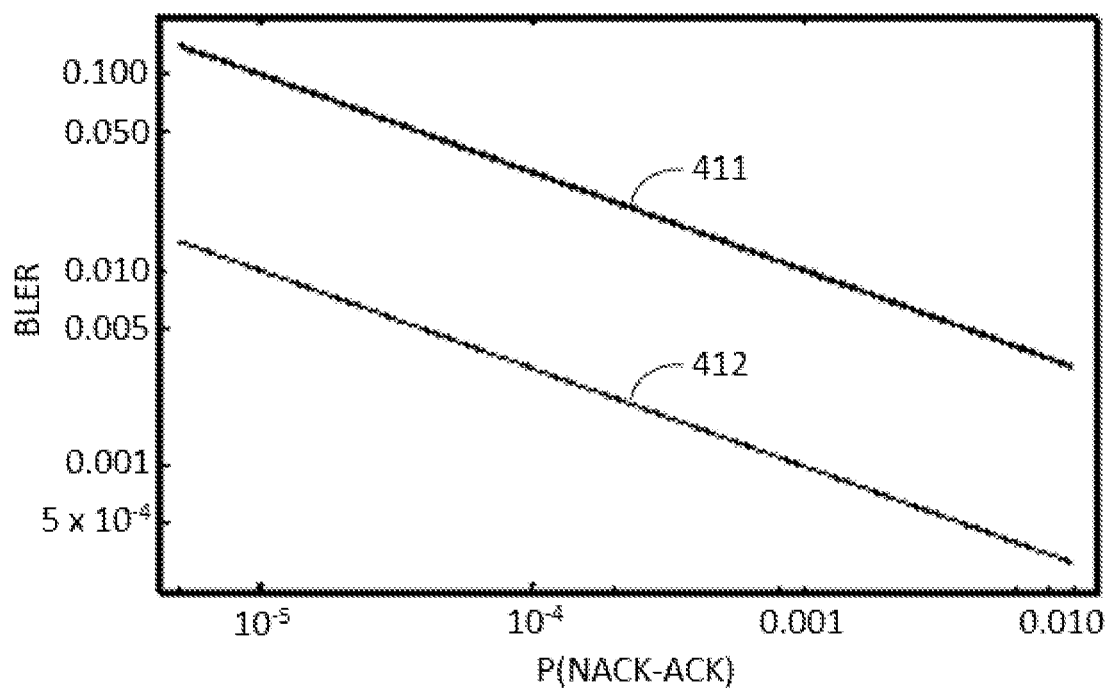
FIGS. 4a, 4b, 5a and 5b illustrate examples of block error rate as a function of error probability.

FIG. 4a illustrates BLER for the normal mode as a function of the NACK-to-ACK error probability (denoted as P(NACK-ACK) in FIG. 4a) for the case of M=2. The reliability targets are $10^{-7}$ as indicated by the upper line 411, and $10^{-9}$ as indicated by the lower line 412.

Figure 4B:
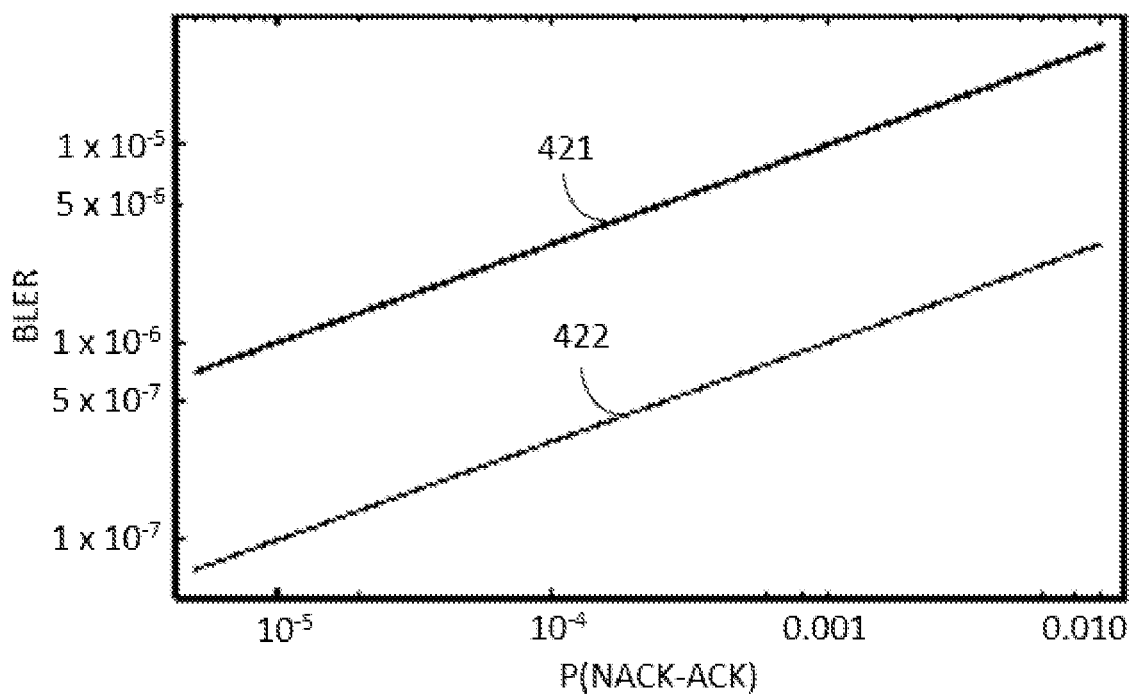

FIG. 4b illustrates BLER for the survival mode as a function of the NACK-to-ACK error probability for the case of M=2. The reliability targets are $10^{-7}$ as indicated by the upper line 421, and $10^{-9}$ as indicated by the lower line 422.

Figure 5A:
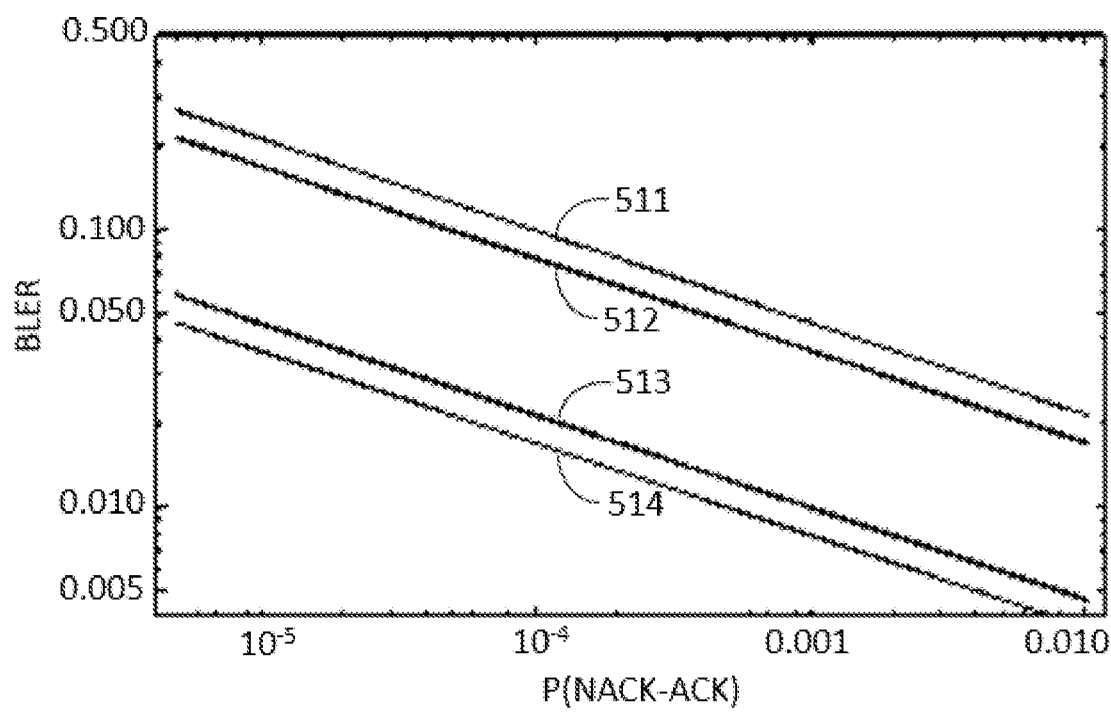

FIG. 5a illustrates BLER for the normal mode as a function of the NACK-to-ACK error probability for the case of M=3. In this scheme, two techniques of ACK/NACK transmissions are considered: a normal one, and another technique where the ACK/NACK transmission n−1 is repeated when ACK/NACKing transmission n. This helps to partially identify NACK-to-ACK errors and prevent a part of the sequences of M consecutive packet losses when M>2. The reliability targets are $10^{-7}$ as indicated by the line 511 for the NACK/ACK repetition technique and the line 512 for the normal NACK/ACK transmission technique, and $10^{-9}$ as indicated by the line 513 for the NACK/ACK repetition technique and the line 514 for the normal NACK/ACK transmission technique.

Figure 5B:
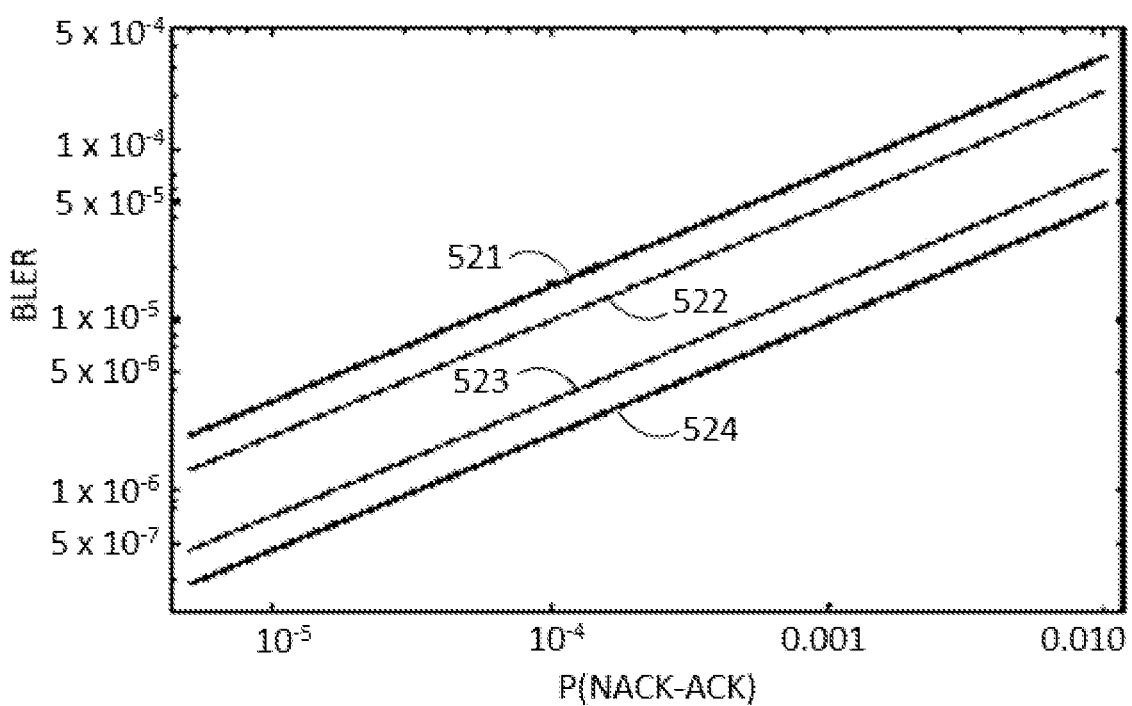

FIG. 5b illustrates BLER for the survival mode as a function of the NACK-to-ACK error probability for the case of M=3. The reliability targets are $10^{-7}$ as indicated by the line 521 for the normal NACK/ACK transmission technique and the line 522 for the NACK/ACK repetition technique, and $10^{-9}$ as indicated by the line 523 for the normal NACK/ACK transmission technique and the line 524 for the NACK/ACK repetition technique.

With a more reliable feedback channel, i.e. the lower rows of Table 2, the normal operation mode can use higher target BLER values, thus using more aggressive MCSs (i.e. MCSs that result in a higher data rate) which increase the overall spectral efficiency of the system. With M=3, the target BLER of the normal operation mode is less stringent compared to the case with M=2, and thus a more aggressive link adaptation and MCS may be used to improve overall spectral efficiency. Similarly, with M=3, the target BLER of the survival mode are less stringent compared to M=2, thus adding more room for resource utilization efficiency. This also applies to the case with M>3. With M=2, the reliability requirement for the feedback control channel is more demanding, which may be addressed by configuring the feedback channel based on the service availability requirements.

The reliability of the feedback channel directly influences the service availability. For example, a NACK-to-ACK error is likely to result in consecutive errors. This can be addressed by configuring the feedback channel reliability according to the target BLER capabilities of the UE. A feedback channel may be configured with various reliability levels by choosing among orders of repetition, channel coding methods, asymmetric detection schemes, etc. For example, if the UE is currently required to deliver a reliability of $10^{-6}$, but it is not capable of doing that, and is actually capable of delivering a maximum reliability of $10^{-5}$, then the feedback channel can be adjusted based on the maximum reliability that the UE is capable of delivering.

Figure 6:
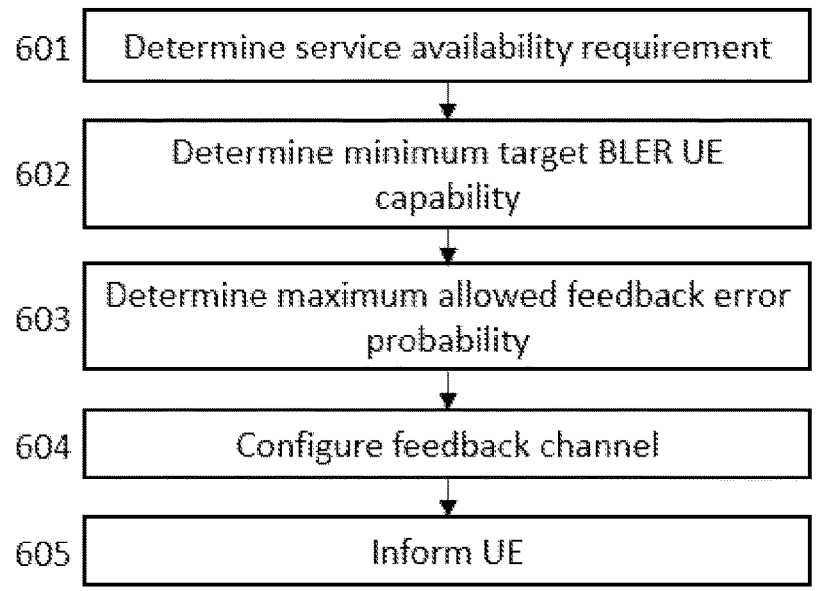
FIGS. 6-8 illustrate flow charts according to some exemplary embodiments.

FIG. 6 illustrates a flow chart according to an exemplary embodiment. The functions illustrated in FIG. 6 may be performed by an apparatus such as a base station, or by a scheduler comprised in a base station. In this exemplary embodiment, the feedback channel is configured for a UE based on the service availability requirement and the target BLER capabilities of the UE, which are used as constraints at the scheduler. In other words, the required reliability for the feedback channel is enforced in order to guarantee that the service availability can be satisfied by the UE.

Referring to FIG. 6, a service availability requirement for a UE and a limit of consecutive errors are determined 601. The limit of consecutive errors indicates the number of consecutive errors for declaring service non-availability by the UE.

The minimum target BLER that the UE is capable of delivering is determined 602. The minimum target BLER indicates the minimum achievable target BLER for the survival mode and the normal mode. The minimum target BLER capability may be based on the link quality, for example the received SNR from the UE, and the UE capabilities. The set of UE capabilities may comprise, for example, the supported transmit power level at the UE, the number of antennas at the UE, configured MCS tables, resource allocation, and/or maximum supported bandwidth.

The maximum allowed feedback error probability for the UE is determined 603 based on the service availability requirement. As a non-limiting example, the required feedback error probability may be obtained from a pre-defined look-up table.

The feedback channel is configured 604 based at least partly on the determined maximum feedback error probability and the minimum target BLER capability of the UE. In other words, the feedback physical channel attributes are configured to satisfy the required feedback channel reliability, and the asymmetric physical layer detection scheme is configured to satisfy the required NACK-to-ACK probability of error. The feedback physical channel attributes may comprise, for example, transmit power level, channel coding scheme, and/or physical uplink control channel type and configuration, which involves repetition order.

An indication may then be transmitted 605 to the UE to inform the UE about the configuration. For example, the indication may define the physical uplink control channel types to be used. The indication may be transmitted to the UE for example via radio resource control (RRC) signaling.

Figure 7:
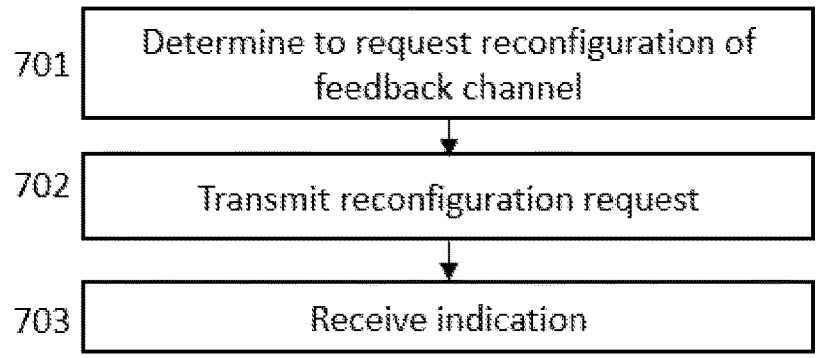

FIG. 7 illustrates a flow chart according to another exemplary embodiment, wherein a UE identifies that a reconfiguration of the feedback channel is needed, and the UE requests reconfiguration of the feedback channel reliability based on its capabilities and the service availability requirements. The reconfiguration may be needed, for example, if there is a change in the UE transmit power capability for example due to entering a power saving mode, or there is a change in the experienced radio conditions, for example if the UE is experiencing a low SNR link due to momentary blockage. The UE may also predict a change in the SNR link for example by using visible light cameras to predict a change in line-of-sight to non-line-of-sight of the channel, which may reduce SNR, i.e. link quality. Reconfiguration of the feedback channel may also be requested, if there is a change in the load of the UE according to its available transmission capabilities, for example if the UE needs to prioritize multiple traffic streams, which leaves it with moderate BLER capabilities for motion control traffic, as opposed to a requested low BLER.

Referring to FIG. 7, the UE determines 701 to request reconfiguration of the feedback channel, and transmits 702 a reconfiguration request to the base station for example via RRC to request reconfiguration of the feedback channel based on the set of UE capabilities and the service availability requirement. An indication is received 703 from the base station, for example via RRC, indicating reconfiguration of the feedback channel.

Figure 8:
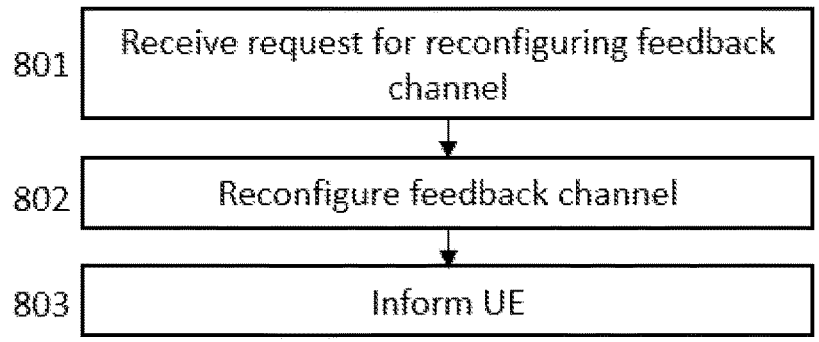

FIG. 8 illustrates a flow chart according to an exemplary embodiment corresponding with FIG. 7, wherein FIG. 8 is from the perspective of the base station, and FIG. 7 is from the perspective of the UE. Referring to FIG. 8, a request is received 801 from the UE to reconfigure the feedback channel based at least partly on a changed set of capabilities associated with the UE, comprising for example the minimum achievable target BLER capability of the UE. The request may be received for example via RRC. The feedback channel is reconfigured 802 upon receiving the request. An indication is transmitted 803 to the UE, for example via RRC, to inform the UE about the reconfiguration.

The functions and/or blocks described above by means of FIGS. 6-8 are in no absolute chronological order, and some of them may be performed simultaneously or in an order differing from the described one. Other functions and/or blocks may also be executed between them or within them.

A technical advantage provided by some exemplary embodiments is that they may improve service availability, as well as the efficiency of radio resource utilization. Some exemplary embodiments reduce the resource drain on the scheduler, and enable it to schedule with higher efficiency of resource utilization.

Figure 9:
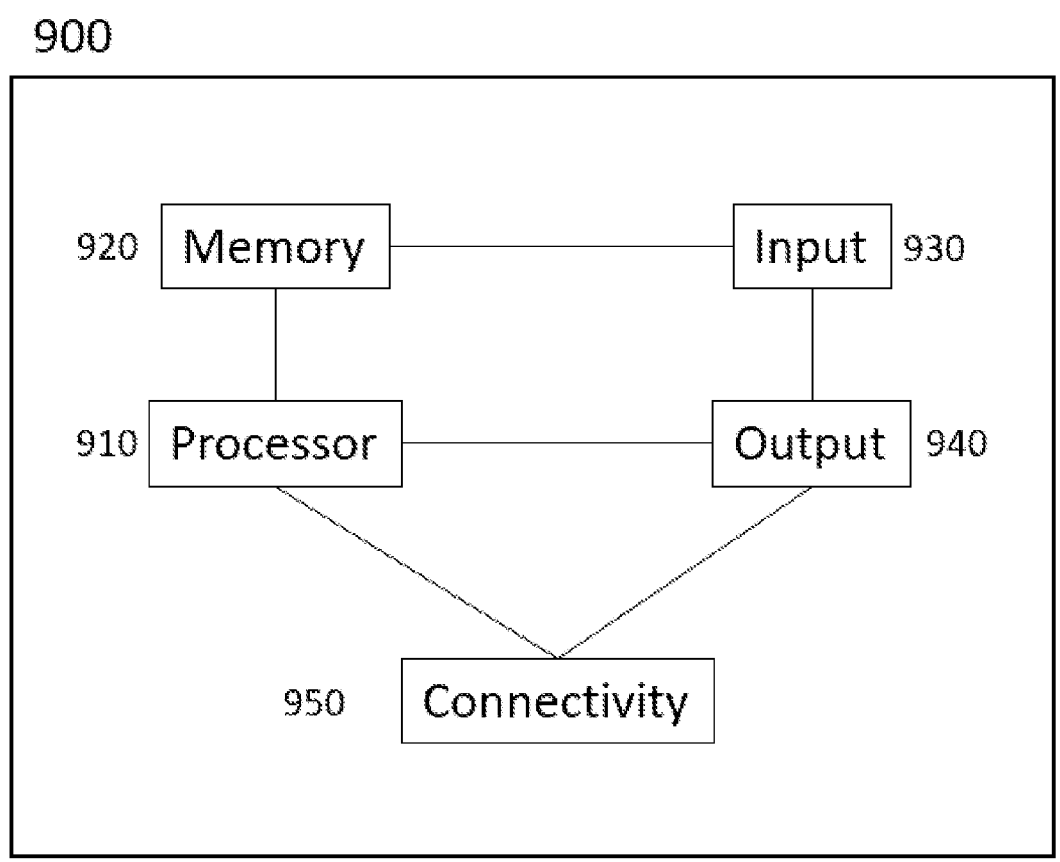
FIGS. 9-10 illustrate apparatuses according to some exemplary embodiments.

FIG. 9 illustrates an apparatus 900, which may be an apparatus such as, or comprised in, a terminal device, according to an exemplary embodiment. A terminal device may also be referred to as a UE herein. The apparatus 900 comprises a processor 910. The processor 910 interprets computer program instructions and processes data. The processor 910 may comprise one or more programmable processors. The processor 910 may comprise programmable hardware with embedded firmware and may, alternatively or additionally, comprise one or more application specific integrated circuits, ASICs.

The processor 910 is coupled to a memory 920. The processor is configured to read and write data to and from the memory 920. The memory 920 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 920 stores computer readable instructions that are executed by the processor 910. For example, non-volatile memory stores the computer readable instructions and the processor 910 executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 900 may further comprise, or be connected to, an input unit 930. The input unit 930 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 930 may comprise an interface to which external devices may connect to.

The apparatus 900 may also comprise an output unit 940. The output unit may comprise or be connected to one or more displays capable of rendering visual content, such as a light emitting diode (LED) display, a liquid crystal display (LCD) and/or a liquid crystal on silicon (LCoS) display. The output unit 940 may further comprise one or more audio outputs. The one or more audio outputs may be for example loudspeakers.

The apparatus 900 further comprises a connectivity unit 950. The connectivity unit 950 enables wireless connectivity to one or more external devices. The connectivity unit 950 comprises at least one transmitter and at least one receiver that may be integrated to the apparatus 900 or that the apparatus 900 may be connected to. The at least one transmitter comprises at least one transmission antenna, and the at least one receiver comprises at least one receiving antenna. The connectivity unit 950 may comprise an integrated circuit or a set of integrated circuits that provide the wireless communication capability for the apparatus 900. Alternatively, the wireless connectivity may be a hardwired application specific integrated circuit (ASIC). The connectivity unit 950 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 900 may further comprise various components not illustrated in FIG. 9. The various components may be hardware components and/or software components.

Figure 10:
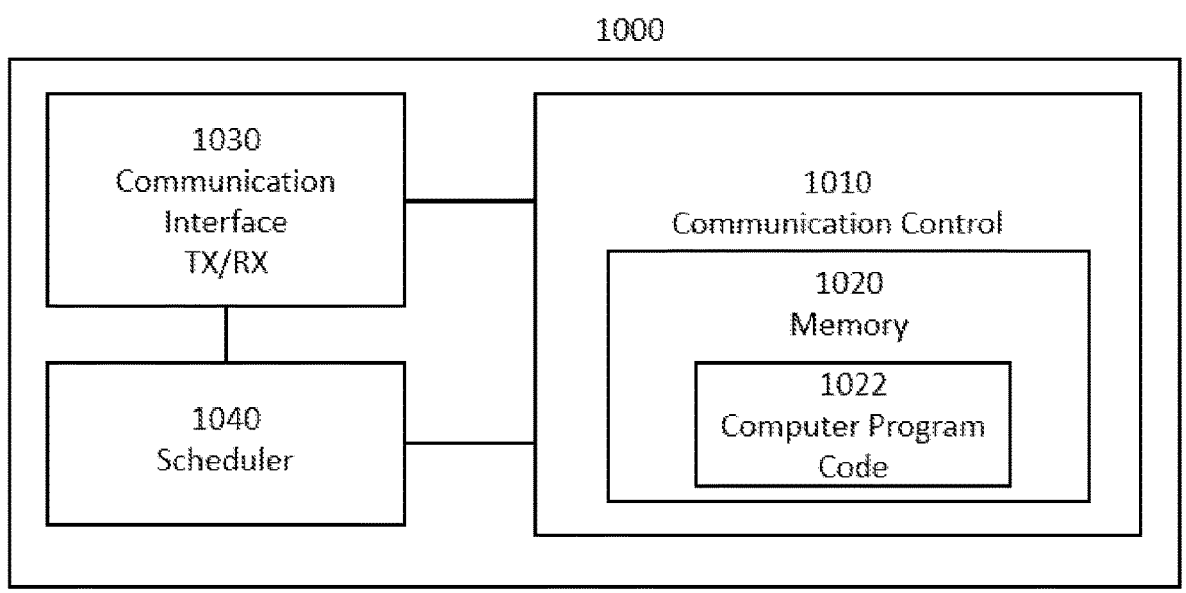

The apparatus 1000 of FIG. 10 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1000 may be an electronic device comprising one or more electronic circuitries. The apparatus 1000 may comprise a communication control circuitry 1010 such as at least one processor, and at least one memory 1020 including a computer program code (software) 1022 wherein the at least one memory and the computer program code (software) 1022 are configured, with the at least one processor, to cause the apparatus 1000 to carry out some of the exemplary embodiments described above.

The memory 1020 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1000 may further comprise a communication interface 1030 comprising hardware and/or software for realizing communication connectivity according to one or more communication protocols. The communication interface 1030 comprises at least one transmitter (TX) and at least one receiver (RX) that may be integrated to the apparatus 1000 or that the apparatus 1000 may be connected to. The communication interface 1030 provides the apparatus with radio communication capabilities to communicate in the cellular communication system. The communication interface may, for example, provide a radio interface to terminal devices. The apparatus 1000 may further comprise another interface towards a core network such as the network coordinator apparatus and/or to the access nodes of the cellular communication system. The apparatus 1000 may further comprise a scheduler 1040 that is configured to allocate resources.

As used in this application, the term "circuitry" may refer to one or more or all of the following:
a. hardware-only circuit implementations (such as implementations in only analog and/or digital circuitry) and
b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions in should be interpreted broadly, and they are intended to illustrate, not to restrict, the exemplary embodiments.

The invention claimed is:

1. An apparatus, comprising:
at least one processor; and
at least one non-transitory memory storing instructions that, when executed with the at least one processor, cause the apparatus to perform:
   identifying a service availability requirement and a survival time requirement for a terminal device;
   estimating a reliability level of a feedback channel associated with the terminal device based at least partly on a link quality and one or more physical control channel attributes associated with the terminal device; and
   determining a first target block error rate value for a first operation mode of the terminal device and a second target block error rate value for a second operation mode of the terminal device based at least partly on the service availability requirement, the survival time requirement, and the estimated reliability level of the feedback channel, wherein each of the first target block error rate and the second target block error rate is determined further based on a service non-availability requirement and an error probability, wherein the service non-availability requirement is based on the service availability requirement, and wherein the error probability is based on the estimated reliability level of the feedback channel;
   configuring the feedback channel based at least partly on the service availability requirement, the link quality, and a set of capabilities associated with the terminal device;
   receiving a request from the terminal device for reconfiguring the feedback channel based at least partly on a changed set of capabilities associated with the terminal device, wherein the request is transmitted, in response to one or more capabilities in the set of capabilities changing, or in response to one or more radio conditions associated with the apparatus changing, or in response to a link quality between the terminal device and the apparatus being predicted to change;

reconfiguring the feedback channel based at least partly on the changed set of capabilities associated with the terminal device; and transmitting an indication to the terminal device indicating reconfiguration of the feedback channel.

2. An apparatus according to claim 1, wherein the instructions, when executed with the at least one processor, cause the apparatus to perform:

setting the second target block error rate value as a target for the terminal device, if a feedback received from the terminal device with the feedback channel indicates that a previous packet has failed to be received with the terminal device.

3. An apparatus according to claim 1, wherein the instructions, when executed with the at least one processor, cause the apparatus to perform:

setting the first target block error rate value as a target for the terminal device, if a feedback received from the terminal device with the feedback channel indicates that a previous packet has been successfully received with the terminal device.

4. An apparatus according to claim 1, wherein the instructions, when executed with the at least one processor, cause the apparatus to perform:

setting the second target block error rate value as a target for the terminal device, if a packet transmitted from the terminal device fails to be decoded with the apparatus.

5. An apparatus according to claim 1, wherein the instructions, when executed with the at least one processor, cause the apparatus to perform:

setting the first target block error rate value as a target for the terminal device, if a packet transmitted from the terminal device is successfully decoded with the apparatus.

6. An apparatus according to claim 1, wherein the second target block error rate value is selected from a plurality of second target block error rate values based at least partly on a number of consecutive negative acknowledgements received from the terminal device with the feedback channel.

7. An apparatus according to claim 1, wherein the first target block error rate value and the second target block error rate value are obtained from a pre-defined look-up table.

8. An apparatus according to claim 1, wherein the first target block error rate value is determined with calculating $P_n \leq \sqrt{P_{SNA}}/\sqrt{P_{N2A}}$ and the second target block error rate value is determined with calculating $P_s \leq \sqrt{P_{N2A} P_{SNA}}$, wherein $P_n$ is the first target block error rate value, $P_s$ is the second target block error rate value, $P_{SNA}$ is a service non-availability requirement based on the service availability requirement, and $P_{N2A}$ is an error probability based on the reliability level of the feedback channel.

9. An apparatus according to claim 1, wherein the service availability requirement and the survival time requirement are identified based on a quality of service associated with the terminal device.

10. An apparatus according to claim 1, wherein the apparatus comprises a base station.

11. An apparatus, comprising:
at least one processor; and
at least one non-transitory memory storing instructions that, when executed with the at least one processor, cause the apparatus to perform:
transmitting a request to a base station for reconfiguring a feedback channel between the apparatus and the base station based at least partly on a service availability requirement and a set of capabilities associated with the apparatus, wherein the request is transmitted, in response to one or more capabilities in the set of capabilities changing, or in response to one or more radio conditions associated with the apparatus changing, or in response to a link quality between the apparatus and the base station being predicted to change, and wherein, upon receipt of the request, the base station reconfigures the feedback channel based at least partly on the changed set of capabilities associated with the terminal device and transmits an indication to the terminal device indicating reconfiguration of the feedback channel; and receiving the indication from the base station indicating reconfiguration of the feedback channel, wherein, prior to the transmitting of the request, configuring of the feedback channel by the base station includes
identifying a service availability requirement and a survival time requirement for a terminal device,
estimating a reliability level of a feedback channel associated with the terminal device based at least partly on a link quality and one or more physical control channel attributes associated with the terminal device,
determining a first target block error rate value for a first operation mode of the terminal device and a second target block error rate value for a second operation mode of the terminal device based at least partly on the service availability requirement, the survival time requirement, and the estimated reliability level of the feedback channel, wherein each of the first target block error rate and the second target block error rate is determined further based on a service non-availability requirement and an error probability, wherein the service non-availability requirement is based on the service availability requirement, and wherein the error probability is based on the estimated reliability level of the feedback channel, and
configuring the feedback channel based at least partly on the service availability requirement, the link quality, and a set of capabilities associated with the terminal device.

12. An apparatus according to claim 11, wherein the apparatus comprises a terminal device.

13. A method, comprising:
identifying a service availability requirement and a survival time requirement for a terminal device;
estimating a reliability level of a feedback channel associated with the terminal device based at least partly on a link quality and one or more physical control channel attributes associated with the terminal device; and
determining a first target block error rate value for a first operation mode of the terminal device and a second target block error rate value for a second operation mode of the terminal device based at least partly on the service availability requirement, the survival time requirement, and the estimated reliability level of the feedback channel, wherein each of the first target block error rate and the second target block error rate is determined further based on a service non-availability requirement and an error probability, wherein the service non-availability requirement is based on the service availability requirement, and wherein the error probability is based on the estimated reliability level of the feedback channel;

configuring the feedback channel based at least partly on the service availability requirement, the link quality, and a set of capabilities associated with the terminal device;

receiving a request from the terminal device for reconfiguring the feedback channel based at least partly on a changed set of capabilities associated with the terminal device, wherein the request is transmitted, in response to one or more capabilities in the set of capabilities changing, or in response to one or more radio conditions associated with the apparatus changing, or in response to a link quality between the terminal device and the apparatus being predicted to change;

reconfiguring the feedback channel based at least partly on the changed set of capabilities associated with the terminal device; and transmitting an indication to the terminal device indicating reconfiguration of the feedback channel.

14. A non-transitory program storage device readable with an apparatus, tangibly embodying a program of instructions executable with the apparatus for performing the method of claim 13.

15. A method, comprising:

transmitting a request to a base station for reconfiguring a feedback channel between the apparatus and the base station based at least partly on a service availability requirement and a set of capabilities associated with the apparatus, wherein the request is transmitted, in response to one or more capabilities in the set of capabilities changing, or in response to one or more radio conditions associated with the apparatus changing, or in response to a link quality between the apparatus and the base station being predicted to change, and wherein, upon receipt of the request, the base station reconfigures the feedback channel based at least partly on the changed set of capabilities associated with the terminal device and transmits an indication to the terminal device indicating reconfiguration of the feedback channel; and receiving the indication from the base station indicating reconfiguration of the feedback channel, wherein, prior to the transmitting of the request, configuring of the feedback channel by the base station includes identifying a service availability requirement and a survival time requirement for a terminal device, estimating a reliability level of a feedback channel associated with the terminal device based at least partly on a link quality and one or more physical control channel attributes associated with the terminal device, and determining a first target block error rate value for a first operation mode of the terminal device and a second target block error rate value for a second operation mode of the terminal device based at least partly on the service availability requirement, the survival time requirement, and the estimated reliability level of the feedback channel, wherein each of the first target block error rate and the second target block error rate is determined further based on a service non-availability requirement and an error probability, wherein the service non-availability requirement is based on the service availability requirement, and wherein the error probability is based on the estimated reliability level of the feedback channel, and configuring the feedback channel based at least partly on the service availability requirement, the link quality, and a set of capabilities associated with the terminal device.

16. A non-transitory program storage device readable with an apparatus, tangibly embodying a program of instructions executable with the apparatus for performing the method of claim 15.

* * * * *